Oct. 4, 1966  W. F. CARR  3,276,583
PAPER MACHINERY
Filed March 5, 1963  2 Sheets-Sheet 1
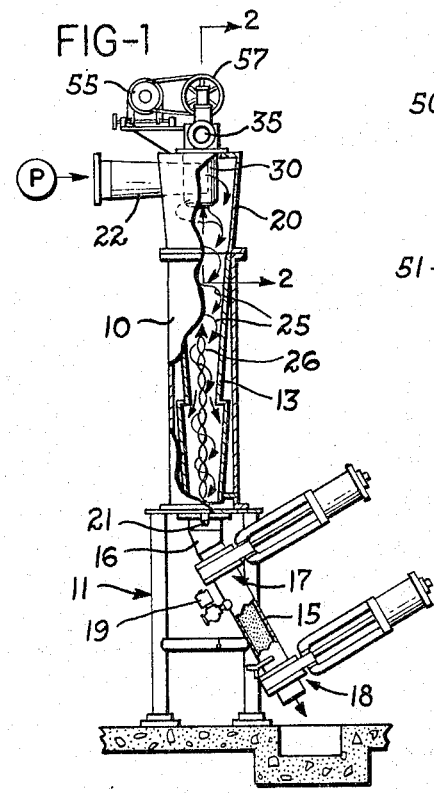
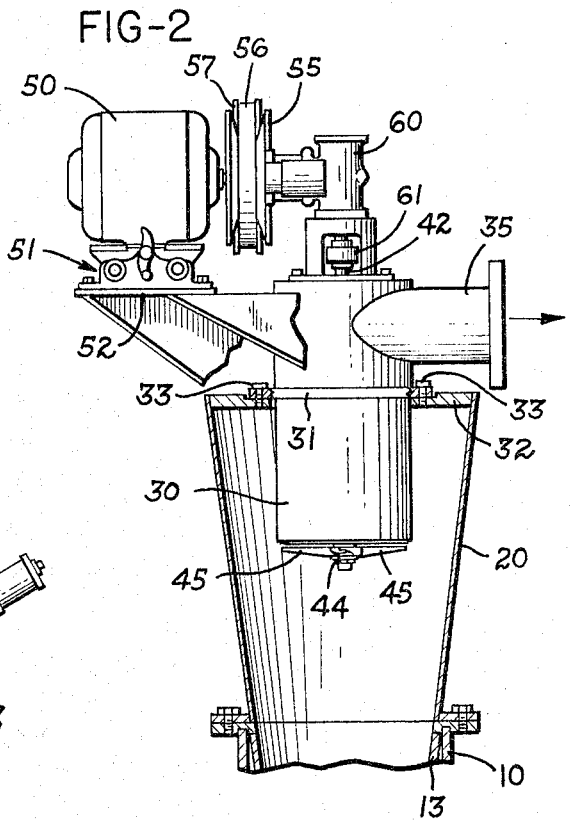
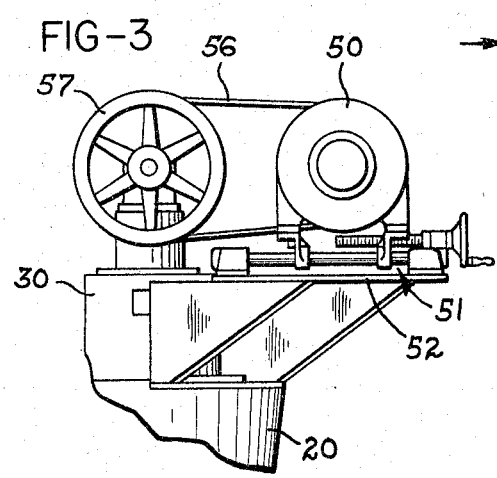
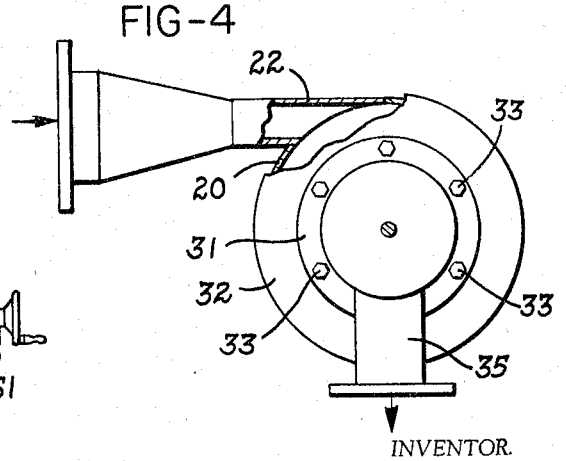
INVENTOR.
WAYNE F. CARR
BY Marechal, Biebel, French & Bugg
ATTORNEYS Oct. 4, 1966  W. F. CARR  3,276,583
PAPER MACHINERY
Filed March 5, 1963  2 Sheets-Sheet 2
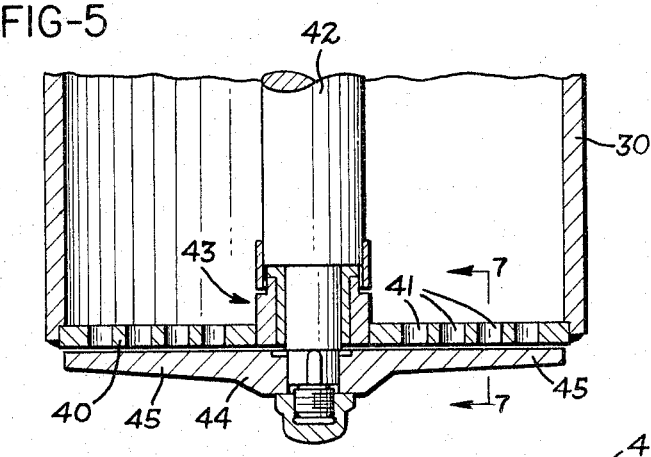
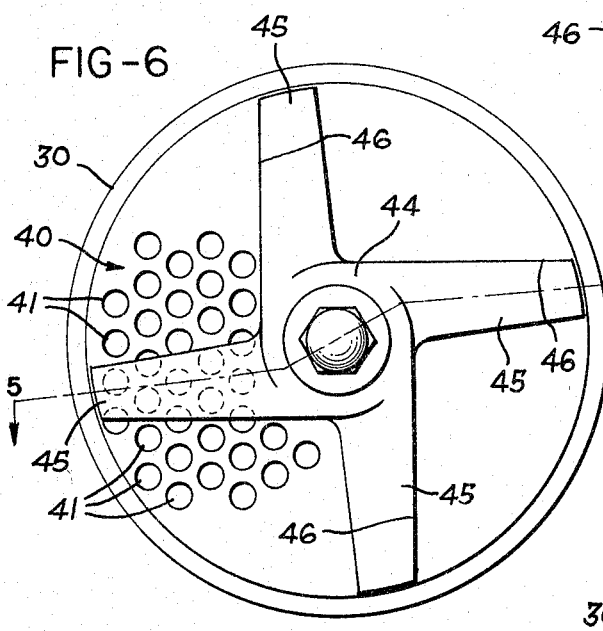
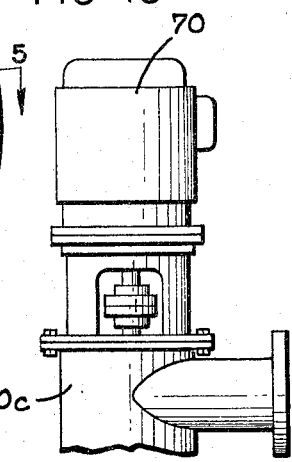
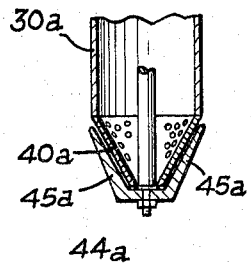
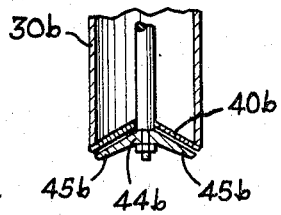
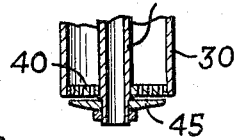
INVENTOR.
WAYNE F. CARR
BY
*Marechal, Biebel, French & Bugg*
ATTORNEYS

United States Patent Office 3,276,583
Patented Oct. 4, 1966

3,276,583
PAPER MACHINERY
Wayne F. Carr, Hamilton, Ohio, assignor to The Black-Clawson Company, Hamilton, Ohio, a corporation of Ohio
Filed Mar. 5, 1963, Ser. No. 262,898
9 Claims. (Cl. 209—211)

This invention relates to cyclone separators, and it has specific relation to hydrocyclones of the type commonly used for the cleaning of cellulose suspensions and similar liquid slurries.

The invention is especially concerned with a problem which is typified in the use of hydrocyclones for cellulose purification and classification by the tendency of knots and other large particles or bundles of fibers to be entrained with the accepted material, either because of a similar specific gravity or because their shape causes them to be entrained in the accepted flow. It is a major object of the present invention to provide a cyclone separator which will remove such large particles from its accept flow line for accepted material.

It is a particular object of the invention to provide a hydrocyclone adapted for use in the cleaning of cellulose slurries which will effectively prevent inclusion with the accepted material of knots and other large bundles or particles of fiber or the like.

Another object of the invention is to provide inlet and outlet structure capable of attachment to an existing cyclone separator which will prevent inclusion with the accepted material from the separator of large particles whose specific gravity or shape causes them to tend to be entrained with the accepted material.

An additional object is to provide a cyclone separator wherein large particles similar in specific gravity to the accepted material are repeatedly prevented from entering the outlet for accepted material and are returned to the column of material to be cleaned.

It is also an object of the invention to accomplish the above outlined results by an inlet and outlet structure for a cyclone separator which includes a screen covering the outlet for accepted material together with a driven rotor supported on the inlet side of the screen for effecting radial discharge of such large particles from the surface of the screen.

A further object of the invention is to provide an outlet screen arrangement and rotor as described above wherein the rotor may be driven at a speed substantially matching the spiraling rate of the flow of accepted material as it leaves the separator.

Still other objects and advantages of the invention will be apparent from the following description, the accompanying drawings and the appended claims.

In the drawings:

FIG. 1 is a side elevational view, partly broken away in vertical section, of a hydrocyclone constructed in accordance with the invention;

FIG. 2 is a fragmentary view on a larger scale partly in side elevation and partly broken away in vertical section on the line 2—2 of FIG. 1;

FIG. 3 is a fragmentary view in side elevation looking in the opposite direction from FIG. 1;

FIG. 4 is a plan view of the hydrocyclone of FIG. 1 with the motor and drive removed for clarity of illustration;

FIG. 5 is a fragmentary view on a larger scale of the outlet structure of the device of FIGS. 1 and 2, the view being in section on the line 5—5 of FIG. 6;

FIG. 6 is a bottom view of the parts shown in FIG. 5;

FIG. 7 is a fragmentary section on the line 7—7 of FIG. 5;

FIG. 8 is a fragmentary view in vertical section of an alternate construction for the mechanism shown in FIG. 5;

FIG. 9 is a view similar to FIG. 8 showing another alternate construction;

FIG. 10 is a fragmentary elevational view showing an alternate drive arrangement; and FIG. 11 is a view similar to FIG. 8 showing another form of the invention.

Referring to the drawings, which illustrate preferred embodiments of the invention, the hydrocyclone of FIG. 1 includes an outer shell 10 which is mounted on a base indicated generally at 11 and is provided internally with a double conical liner 13. The reject removal system for effecting discharge of reject particles from the cyclone includes a reject collection chamber 15 connected with the bottom end of the shell 10 at 16 and provided with a pair of valve assemblies 17 and 18. In operation, the valve 17 is normally open and the valve 18 is normally closed to provide for accumulation of reject particles in the chamber 15. Intermittent or periodic dumping of accumulated reject material is effected by closing valve 17 and opening valve 18, and the valve 19 provides for addition of water or black liquor during and after such dumping to prevent the introduction of air to the interior of the liner 13.

The invention is particularly concerned with the inlet and outlet structure mounted on top of the shell 10 for delivering stock to be cleaned to the conical section 13 and for discharging accepted material. This structure includes a tubular outer casing 20 which may advantageously be of frusto-conical section matching the size and taper of the upper section of the liner 13 as shown, and it is provided at its lower end with an inlet 21 for elutriation water. An inlet 22 for the stock to be cleaned connects tangentially with the upper portion of the casing 20 as shown, to deliver the stock with an initial spiraling motion which develops the desired centrifugal separating action as the dirty stock descends in the form of the outer column of liquid adjacent the wall of the liner 13 as indicated by the outer series of arrows 25 in FIG. 1.

The stock from which the heavy reject material has been removed forms an ascending interior spiral column in the liner 13 which is represented by the inner spiral 26 in FIG. 1, and the outlet for this clean stock is provided by a tubular inner casing 30 mounted in telescoping relation with the casing 20 as by means of a peripheral flange 31 on casing 30 which rests on the annular cover portion 32 of casing 20 and is secured thereto by bolts 33. The casing 30 is arranged with a sufficient length of its lower portion received within the casing 20 to extend below the level of the inlet 22 and thereby to serve as a vortex finder for the incoming stock. The upper portion of the casing 30 extends a sufficient distance above the casing 20 for connection thereto of the outlet 35 for accepted stock.

The heavy dirt such as grit, tramp metal particles and the like, is separated from the stock to be accepted in the usual mode of operation of cyclone separators during the descending motion of the outer column 25 and upon its reversal at the bottom of the liner 13, with such separated material accumulating in the collection chamber 15 as previously noted. Knots, shives and other large bundles or lumps of fiber, however, tend to remain with the inner column of stock, particularly if their specific gravity is essentially the same as the clean stock or their shape causes them to be entrained with the clean stock, and the invention is particularly concerned with preventing such large pieces from being discharged with the clean stock.

Referring particularly to FIGS. 5–7, the lower or inlet end of the casing 30 is covered by a screen plate 40 having multiple holes 41, satisfactory results having been obtained in operation utilizing holes of ½-inch diameters spaced on ¾-inch centers. In addition, a shaft 42 extends axially through the casing 30 from above and through a centrally located bearing 43 in the center of the screen 40, and it supports on its lower end a driven rotor 44 comprising a hub provided with a plurality of arms or blades 45 which extend to the outer periphery of the screen 40 in sweeping relation with the surface of the screen.

The arrangement and configuration of the rotor blades 45 are best seen in FIGS. 6 and 7. As shown, each blade 45 projects tangentially from the hub portion of the rotor, and its leading edge 46 is offset in the direction of rotation of the rotor so that it has a sweeping action with respect to the surface of the screen 40 which action has a substantial radial component tending to dislodge large particles into the space lying radially outwardly of the screen. The leading edge 46 of each blade 45 is of substantial width measured axially of the rotor, and it is inclined toward the screen at a definite angle to generate a pressure wave tending to force material through the screen, satisfactory results having been obtained with this angle being in the range of 10 degrees. In addition, each blade includes a flat portion 47 of substantial extent trailing the leading edge 46 and lying parallel with the screen surface, and each blade is relieved at 48 behind its flat portion 47 to create a low pressure wave tending to lift material away from the screen surface.

It has been found particularly desirable in operation if the rotational speed of the rotor arms 45 is substantially the same as or slightly higher than the spiraling rate of the accepted stock as it enters the inlet casing 30. For this purpose, a variable speed drive is provided for the rotor and is mounted on the outer casing 20. Referring particularly to FIGS. 2 and 3, a drive motor 50 is provided with an adjustable mounting 51 on a bracket or shelf 52 secured to the casings 20 and 30. The drive shaft of the motor 50 is provided with a variable speed drive pulley 55 cooperating with a belt 56 to drive a pulley 57 on the input shaft of a gear reduction unit 60 or similar transmission unit. The output shaft of the unit 60 is in turn connected by a suitable coupling 61 with the upper end of the rotor shaft 42.

Tests utilizing a device constructed as described in connection with FIGS. 1–7 indicate that the rotor should operate at substantial speed, preferably 400 r.p.m. or higher. Additionally, the rotor should be positioned in relatively closely spaced relation with the under surface of the screen 40, preferred results having been obtained with this spacing being in the range of 1/16-inch to 1/4-inch, with optimum results being obtained at the closer spacing, particularly with respect to elimination of knots.

The excellent results which have been obtained in the practice of the invention appear to derive from several factors. The screen by itself would prevent discharge of large particles with the accepted stock, but the rotating arms 45 not only help to force through the screen material which might otherwise become lodged within its perforations, but they lift away material tending to over-lie the perforations and sweep such material out into the descending annular core of dirty stock which has just entered the top of the casing 20. In addition, there appears to be a definite comminuting action by the rotor arms so that the particles are reduced in size before they are thrown out into the descending stock, and the resulting turbulence appears to reduce them still further in size until they are small enough for passage through the screen.

FIGS. 8, 9 and 10 show other embodiments of the invention which will also function as described above. Thus in FIG. 8, the inner casing 30a is shown as provided with a screen 40a of frustoconical configuration. The rotor 44a is accordingly similarly designed with its blades 45a inclined upwardly in closely over-lying relation with the outer surface of the screen 40a. In FIG. 9, the screen 40b is tapered inwardly of the casing 30b, and the rotor 44b has correspondingly inclined blades 45b which should otherwise be essentially the same in section as the rotor arms 45.

FIG. 10 shows a modified arrangement of drive which is applicable to the rotor shaft in any form of the invention already described. In place of the belt drive shown in FIGS. 1–3, a motor 70 may be mounted on top of the inner casing 30c in directly connected relation with the rotor shaft. If the motor 70 is not of a variable speed type, it should preferably be selected to drive the rotor at the proper rotational speed under normal operating conditions to match or exceed slightly the spiraling speed of the accepted stock entering the casing 30c.

FIG. 11 shows an arrangement of essentially the same construction as that of FIG. 2 except that the shaft 75 is hollow to provide for the application of suction therethrough to the interior of the casing 20. Such an arrangement may be employed, for example, for the purpose of removing air from the accepted stock or for effecting selective classification by removing a lighter fraction of material than is discharged by way of the outlet 35.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A cyclone separator comprising a substantially vertical shell including a conical portion having a rejects outlet at the lower end thereof, a tubular outlet casing for accepted stock depending into the upper end of said shell and of substantially smaller diameter than the surrounding portion of said shell to define therewith an annular space, an inlet for stock to be cleaned connecting tangentially through the upper end portion of said shell with said annular space to deliver the stock thereto with an initial spiraling motion for downward travel along the wall of said shell and return upward travel of the accepted stock through the center portion of said shell after separation therefrom of heavy rejects at said reject outlet, said outlet casing having the lower end thereof open and in the upward path of the accepted stock, a screen mounted on said outlet casing and extending across said open end thereof, said screen having perforations therethrough of predetermined diameter establishing the maximum size of the particles admitted to said outlet casing in the accepted stock, and a rotor mounted for rotation in closely spaced relation with the entry side of said screen and having arms extending in sweeping relation with the lower surface of said screen for causing particles too large to pass through said perforations to be dislodged radially of said screen into the downward spiral flow of stock from said annular space.

2. A cyclone separator as defined in claim 1 comprising drive means mounted at the top of said shell, a shaft depending from said drive means through said outlet casing and said screen, and means securing said rotor to said shaft for driven rotation therewith.

3. In a fluid separator having a substantially vertical column, a substantially tangential inlet adjacent the top of the column, a rejects outlet adjacent the bottom of the column, an accepts outlet casing depending from the top of the column and of sufficiently smaller diameter than the surrounding portion of said column to define therewith an annular space, said outlet casing having the lower end thereof open, and means for introducing stock to be separated at high speed into said inlet to cause a spiral flow of the stock downward adjacent the wall of the column and then upward through the center of the downward spiral flow to said open end of said outlet casing, the improvement which comprises the combination with said separator of a screen mounted on said outlet casing and extending across said open end thereof, said screen having perforations therethrough of predetermined diameter establishing the maximum size of the particles admitted to said outlet casing in the accepted stock, and a rotor mounted for rotation in closely spaced relation with the entry side of said screen and having arms extending in sweeping relation with the lower surface of said screen for causing particles too large to pass through said perforations to be dislodged radially of said screen into the downward spiral flow of stock from said annular space.

4. The structure of claim 3 comprising drive means for said rotor constructed and arranged to cause said rotor to rotate at a speed at least substantially equal to and in the same direction as the spiral flow rate of the stock passing through said screen.

5. The structure of claim 3 comprising an adjustable drive means for varying the speed and direction of rotation of said rotor in accordance with the direction and spiral flow rate of the stock passing through said casing.

6. The structure of claim 3 wherein said rotor comprises a hub and a plurality of blades projecting from said hub with the leading edges thereof extending tangentially of said hub in off-set relation with the direction of rotation of said rotor, and each of said leading edges is of substantial axial width to effect an outward sweeping action with respect to the adjacent surface of said screen.

7. The structure of claim 6 in which said leading edge surface of each of said rotor blades is inclined toward said screen and the trailing edge portion of each of said blades is spaced from said screen to effect a pulsating action with respect to said screen in response to rotation of said rotor.

8. An inlet and outlet structure for a cyclone separator comprising a tubular outer casing, a tubular inner casing mounted in telescoping relation with said outer casing with the upper portion thereof extending above said outer casing and the lower portion thereof extending within said outer casing, said inner casing being of substantially smaller diameter than said outer casing to provide an annular space between the telescoping portions thereof, said inner casing having the lower end thereof open, an inlet for stock connecting with said outer casing tangentially at a position opposite said lower portion of said inner casing to deliver stock to said annular space, an outlet for stock leading from said upper portion of said inner casing, a screen mounted on said inner casing and extending across said inner end thereof, said screen having perforations therethrough of predetermined diameter establishing the maximum size of the particles admitted to said inner casing, and a rotor mounted for rotation in closely spaced relation with the entry side of said screen and having arms extending in sweeping relation with the lower surface of said screen for causing particles too large to pass through said perforations to be discharged radially of said screen into the path of stock descending from said annular space.

9. An inlet and outlet structure for a cyclone separator as defined in claim 8 comprising drive means for said rotor mounted on said casings, and shaft means depending from said drive means through said inner casing and said screen in supporting and driving relation with said rotor.

References Cited by the Examiner

UNITED STATES PATENTS

| | | | |
|---|---|---|---|
| 2,835,173 | 5/1958 | Martindale | 209—270 X |
| 3,096,275 | 7/1963 | Tomlinson | 209—211 X |
| 3,174,622 | 3/1965 | Lamort | 209—273 |

HARRY B. THORNTON, *Primary Examiner.*

FRANK W. LUTTER, *Examiner.*

L. H. EATHERTON, *Assistant Examiner.*